(12) United States Patent
Fukushima (10) Patent No.: US 10,931,841 B2
(45) Date of Patent: Feb. 23, 2021

(54) SHEET CONVEYING APPARATUS AND IMAGE SCANNING APPARATUS

(71) Applicant: CANON KABUSHIKI KAISHA, Tokyo (JP)

(72) Inventor: Takayuki Fukushima, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/452,368

(22) Filed: Jun. 25, 2019

(65) Prior Publication Data

US 2020/0007704 A1  Jan. 2, 2020

(30) Foreign Application Priority Data

Jun. 27, 2018 (JP) .............................. JP2018-122285
May 8, 2019 (JP) .............................. JP2019-088185

(51) Int. Cl.
*H04N 1/04* (2006.01)
*H04N 1/00* (2006.01)
*B65H 5/06* (2006.01)
*H04N 1/028* (2006.01)

(52) U.S. Cl.
CPC ......... *H04N 1/00602* (2013.01); *B65H 5/062* (2013.01); *H04N 1/00649* (2013.01); *H04N 1/0289* (2013.01); *B65H 2403/00* (2013.01)

(58) Field of Classification Search
None
See application file for complete search history.

(56) References Cited

U.S. PATENT DOCUMENTS

| | | | |
|---|---|---|---|
| 10,696,505 B2* | 6/2020 | Kakuda | ................ B65H 3/5261 |
| 2012/0228822 A1* | 9/2012 | Akiyama | ................ B65H 5/36 |
| | | | 271/264 |
| 2015/0172491 A1* | 6/2015 | Lee | ........................ B65H 5/06 |
| | | | 358/498 |

FOREIGN PATENT DOCUMENTS

JP  2010-041464 A  2/2010

* cited by examiner

*Primary Examiner* — Cheukfan Lee
(74) *Attorney, Agent, or Firm* — Canon U.S.A., Inc. I.P. Division (57) ABSTRACT

A sheet conveying apparatus includes first and second drive sources, first and second driving units, each including a respective first or second roller to convey a sheet, an operating unit, and a switching unit to switch a state of the sheet conveying apparatus between a first state in which the first driving unit and the second driving unit are not connected to each other and a second state in which the first driving unit and the second driving unit are connected to each other. A first drive source driving force drives the first driving unit. A second drive source driving force drives the second driving unit. The operating unit rotates when manually operated. In the second state, operating unit rotation is transmitted to the first driving unit to rotate the first roller, and operating unit rotation is transmitted to the second driving unit to rotate the second roller.

14 Claims, 12 Drawing Sheets

SHEET CONVEYING APPARATUS AND IMAGE SCANNING APPARATUS

BACKGROUND OF THE INVENTION

Field

The present disclosure relates to a sheet conveying apparatus for conveying sheets and an image scanning apparatus including the same.

Description of the Related Art

In general, there is known an image scanning apparatus including an automatic document feeder (hereinafter referred to as an ADF) that feeds documents placed on an original tray and a scanner that scans images on the sheets fed by the ADF. If a sheet conveyed by the ADF jams, the jammed sheet has to be removed.

Figure 14:
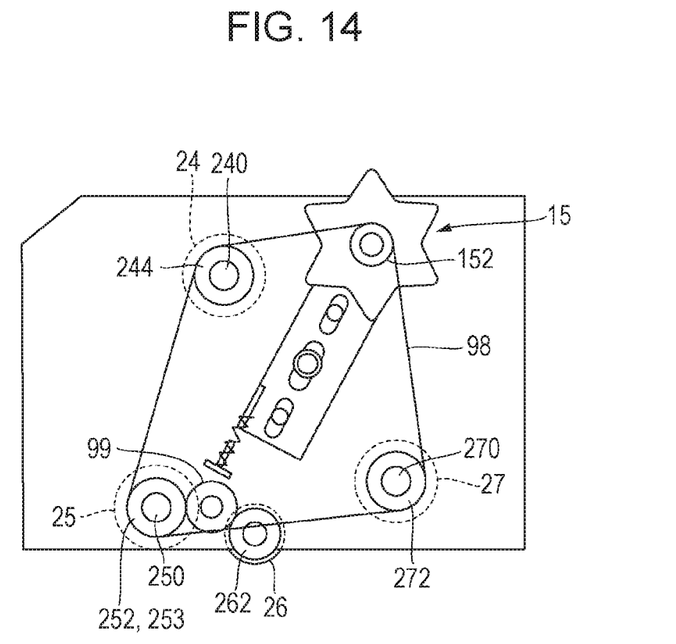
FIG. 14 is a schematic diagram illustrating the drive transmission configuration of an ADF.

An ADF including a jam clearing dial for manually feeding a jammed sheet to a position where the sheet can be gripped and drawn to remove the jammed sheet is disclosed (see Japanese Patent Laid-Open No. 2010-041464). As illustrated in FIG. 14, the ADF includes timing pulleys 244, 252, and 272 which are respectively secured to the drive shafts 240, 250, and 270 of first to third conveying rollers 24, 25, and 27 that convey the sheet. A timing belt 98 is wound around the timing pulleys 244, 252, and 272.

A front-side platen roller gear 262, which transmits drive to a front-side-reading platen roller 26 via an idler gear 99, is connected to a gear 253 integrated with a timing pulley 252. The timing belt 98 is held under tension by a pulley 152 of a jam clearing dial 15. Rotating the jam clearing dial 15 allows manually rotating the first to third conveying rollers 24, 25, and 27 and the front-side-reading platen roller 26 via the timing belt 98 to perform jam clearing. Driving a motor (not illustrated) allows driving a sheet feed roller, a registration roller, and a back-side-reading platen roller, in addition to the first to third conveying rollers 24, 25, and 27 and the front-side-reading platen roller 26.

In normal sheet conveyance, the ADF disclosed in Japanese Patent Laid-Open No. 2010-041464 drives all the rollers in the ADF with a single motor. However, if a plurality of rollers in the ADF are configured to be individually driven by a plurality of motors, the drive of a roller driven by one motor and the drive of rollers driven by the other motors are not transmitted to one another. This results in a decrease in the number of rollers driven using the jam clearing dial, decreasing the jam clearing performance.

SUMMARY OF THE INVENTION

The present disclosure provides a sheet conveying apparatus in which the rollers can be driven using a dial even if a plurality of motors are used to resolve the above issue and an image scanning apparatus including the same.

According to an aspect of the present disclosure, a sheet conveying apparatus includes a first drive source, a first driving unit configured to be driven by a driving force of the first drive source and including a first roller configured to convey a sheet, a second drive source, a second driving unit configured to be driven by a driving force of the second drive source and including a second roller configured to convey the sheet, an operating unit configured to rotate when manually operated, and a switching unit configured to switch a state of the sheet conveying apparatus between a first state in which the first driving unit and the second driving unit are not connected to each other and a second state in which the first driving unit and the second driving unit are connected to each other, wherein, in the second state, rotation of the operating unit is transmitted to the first driving unit to rotate the first roller, and rotation of the operating unit is transmitted to the second driving unit to rotate the second roller.

Further features of the present disclosure will become apparent from the following description of exemplary embodiments with reference to the attached drawings.

DESCRIPTION OF THE EMBODIMENTS

Overall Configuration

Figure 1:
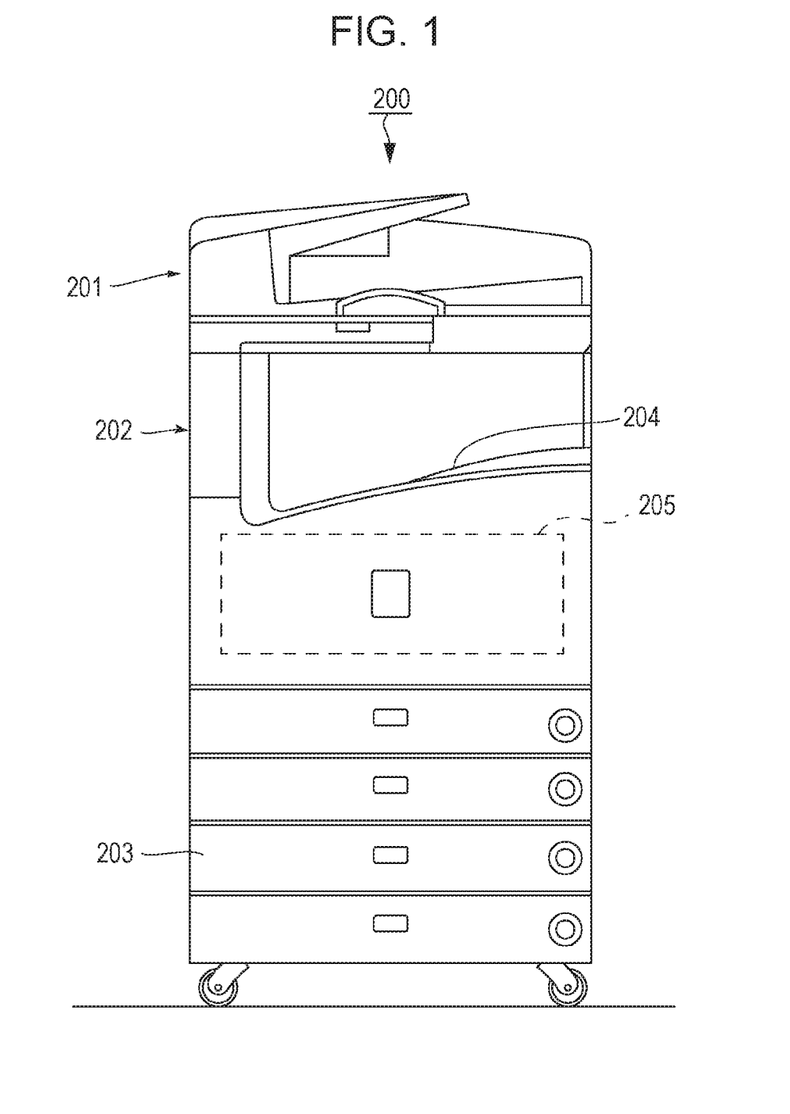
FIG. 1 is an overall view of a printer according to an embodiment of the present disclosure.

A printer 200, which is an image forming apparatus according to the present embodiment, is an electrophotographic laser beam printer. As illustrated in FIG. 1, the printer 200 includes a printer main body 202 and an image scanning apparatus 201 mounted on the top of the printer main body 202.

The printer main body 202 includes an image forming unit 205 that forms an image on a sheet and cassettes 203 for storing sheets to be fed to the image forming unit 205. A discharge tray 204 onto which the sheets are discharged is disposed above the image forming unit 205. The sheets stored in the cassettes 203 are fed by a sheet feed roller (not illustrated) and so on. The image forming unit 205 houses a laser writing unit, an electrophotographic processing unit, and a fixing unit (not illustrated) and forms images on the sheets fed from the cassettes 203 by an electrophotographic system.

Image Scanning Apparatus

Figure 2:
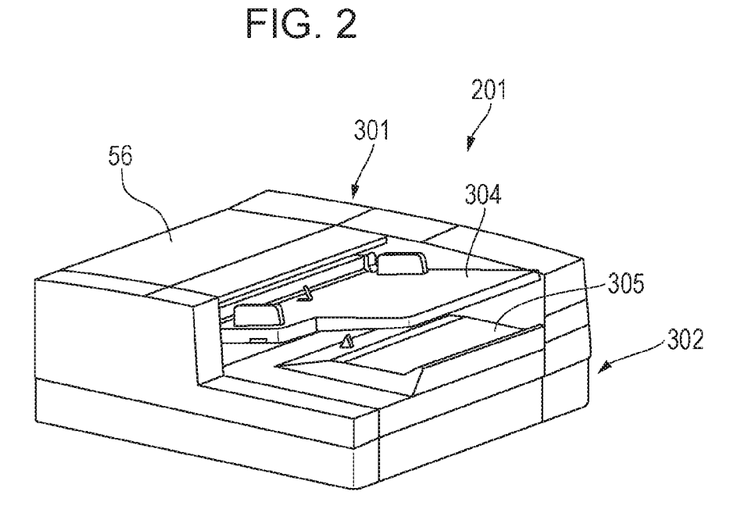
FIG. 2 is a perspective view of an image scanning apparatus according to an embodiment of the present disclosure.
Figure 3:
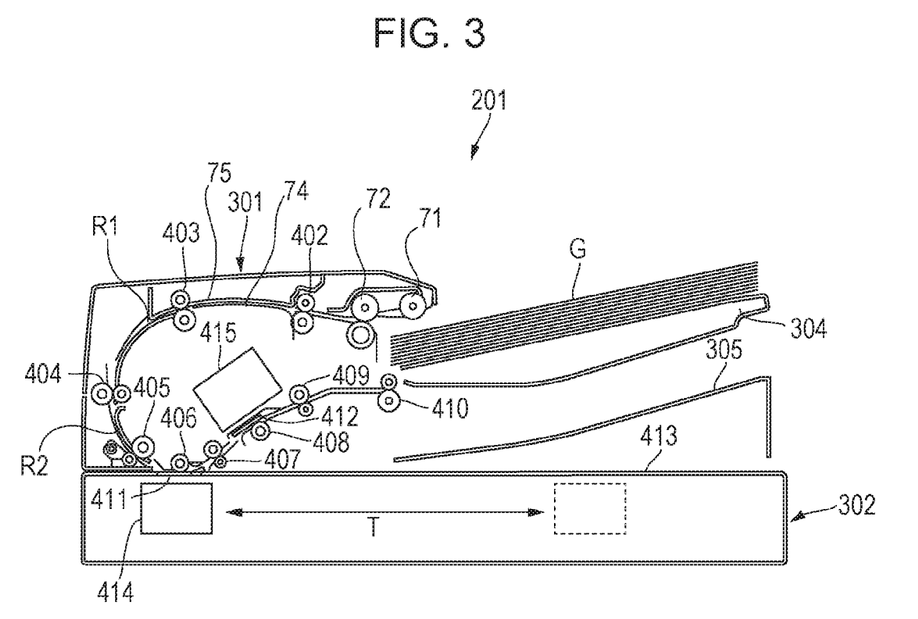
FIG. 3 is a cross-sectional view of the image scanning apparatus.
Figure 5:
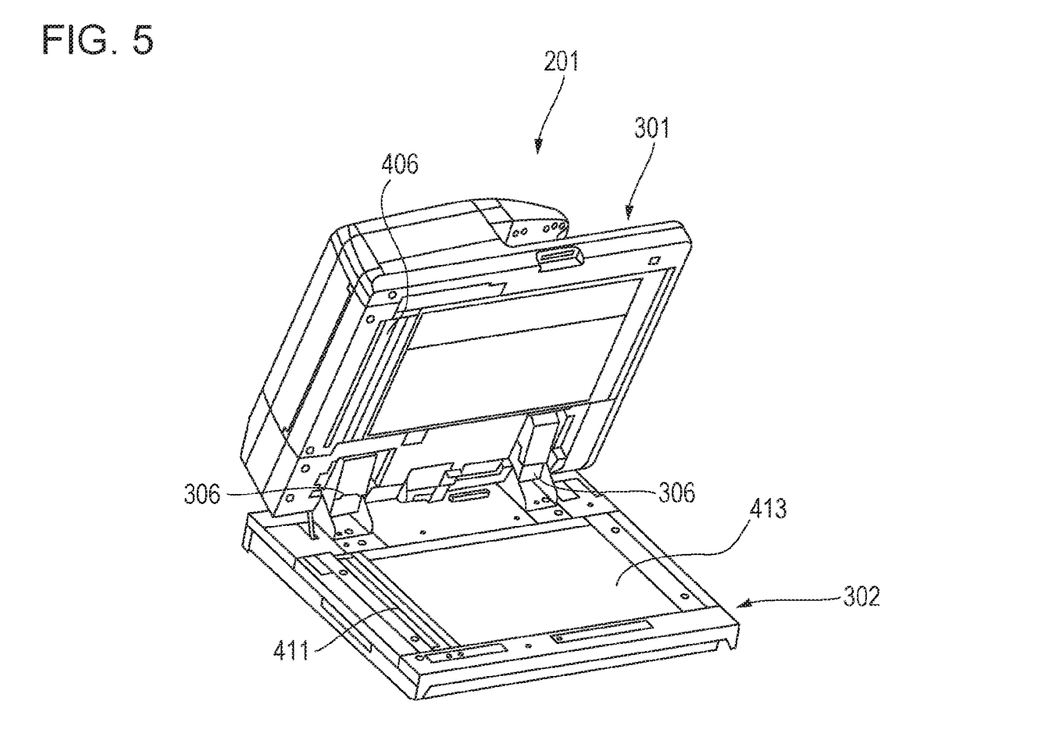
FIG. 5 is a cross-sectional view of the image scanning apparatus in a state in which the automatic document feeder (ADF) is open.

Next, the image scanning apparatus 201 will be described in detail. As illustrated in FIGS. 2 and 3, the image scanning apparatus 201 includes an automatic document feeder (hereinafter referred to as "ADF") 301 that feeds originals G stacked on an original tray 304 to discharge the originals to an original discharge tray 305. The image scanning apparatus 201 further includes a scanning unit 302 that scans the original G conveyed by the ADF 301 serving as a sheet conveying apparatus. As illustrated in FIG. 5, the ADF 301 is supported by two hinges 306 so as to be rotatable with respect to the scanning unit 302 so that an original glass plate 413, described later, is opened. In the present embodiment, the sheet includes a printing material on which an image is formed by the image forming unit 205 and an original from which an image is read by the image scanning apparatus 201. The original includes a blank sheet and a sheet with an image formed on one side or both sides.

As illustrated in FIG. 3, the ADF 301 includes a pickup roller 71, a separation roller pair 72, a plurality of conveying roller pairs 402, 403, 405, 407, and 409, a registration roller pair 404, and a discharge roller pair 410. The ADF 301 further includes a first platen roller 406 opposed to a first platen glass 411, a second platen roller 408 opposed to a second platen glass 412, and a second scanner 415.

The scanning unit 302 includes the first platen glass 411, the original glass plate 413 configured to support the original G, and a first scanner 414. The first scanner 414 serving as a reading unit is configured to move in a sub-scanning direction (in the direction of arrow T). The first scanner 414 and the second scanner 415 each house a light source and a photoelectric conversion element (not illustrated). Examples of the photoelectric conversion element include a charge-coupled device (CCD) sensor and a complementary metal-oxide semiconductor (CMOS) sensor. The light emitted from the light source is reflected by the original G. The reflected light from the original G enters the photoelectric conversion element. The photoelectric conversion element photoelectrically converts the reflected light from the original G to obtain the image on the original G as image information.

The first platen glass 411 and the second platen glass 412 are made of a transparent member, such as glass that allows light to pass through. A configuration for scanning an original conveyed by the ADF 301 is referred to as original flow reading, and a configuration for scanning an original placed on the original glass plate 413 while moving the first scanner 414 in the sub-scanning direction is referred to as original fixed reading.

In the case of original fixed reading, the user opens the ADF 301 and places the original G on the original glass plate 413. Then, the user operates an operation panel (not illustrated) to start original fixed reading with the image scanning apparatus 201. When the original fixed reading is started, the first scanner 414 moves in the sub-scanning direction between the position indicated by the solid line and the position indicated by the broken line in FIG. 3 to read the image on the original on the original glass plate 413.

In the case of original flow reading, the user places the original G on the original tray 304 and operates the operation panel to start the original flow reading with the image scanning apparatus 201. In this case, the first scanner 414 reads the image in a state of being stopped at a position below the first platen glass 411, indicated by the solid line in FIG. 3. The originals G placed on the original tray 304 are fed to an upstream conveying path R1 by the pickup roller 71 and are separated one by one by the separation roller pair 72. The original G passing through the upstream conveying path R1 is conveyed to the first platen glass 411 disposed on a downstream conveying path R2 by the conveying roller pair 405, while its skew is being corrected by the registration roller pair 404.

An image on a first side (a front side) of the original G is read by the first scanner 414 through the first platen glass 411 while the original G is being guided by the first platen roller 406. The original G whose image is read by the first scanner 414 is conveyed to the discharge roller pair 410 by the conveying roller pairs 407 and 409 and is discharged outside the apparatus by the discharge roller pair 410. The original G discharged outside the apparatus is stacked on the original discharge tray 305. In reading an image on a second side (a back side) of the original G whose image on the first side is read by the first scanner 414, the image on the second side is read by the second scanner 415 through the second platen glass 412 while the original G is being guided by the second platen roller 408.

Figure 4:
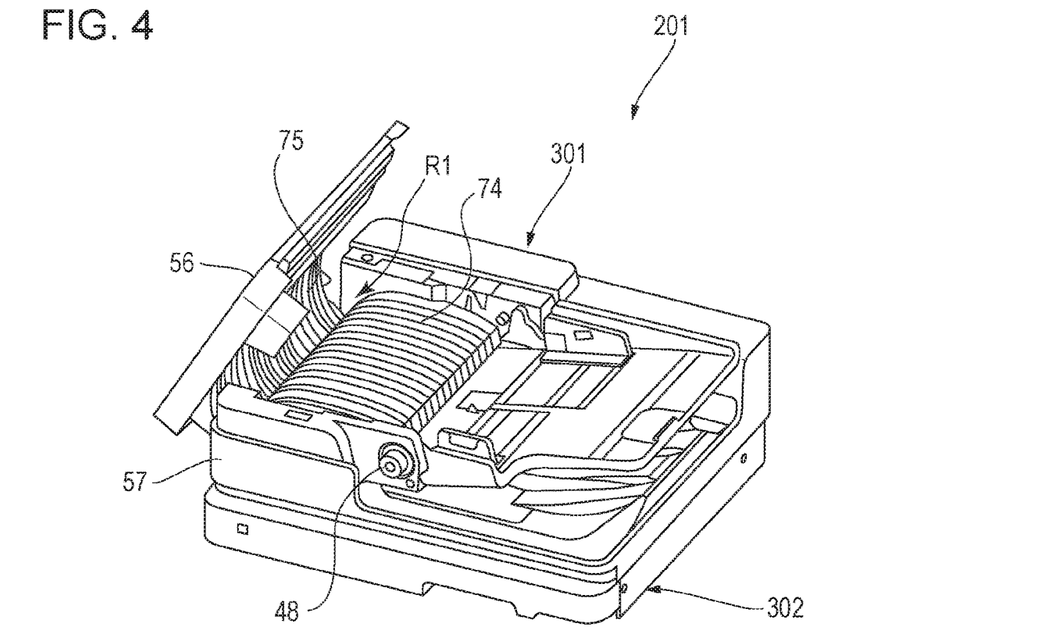
FIG. 4 is a cross-sectional view of the image scanning apparatus in a state in which the cover is open.
Figure 13:
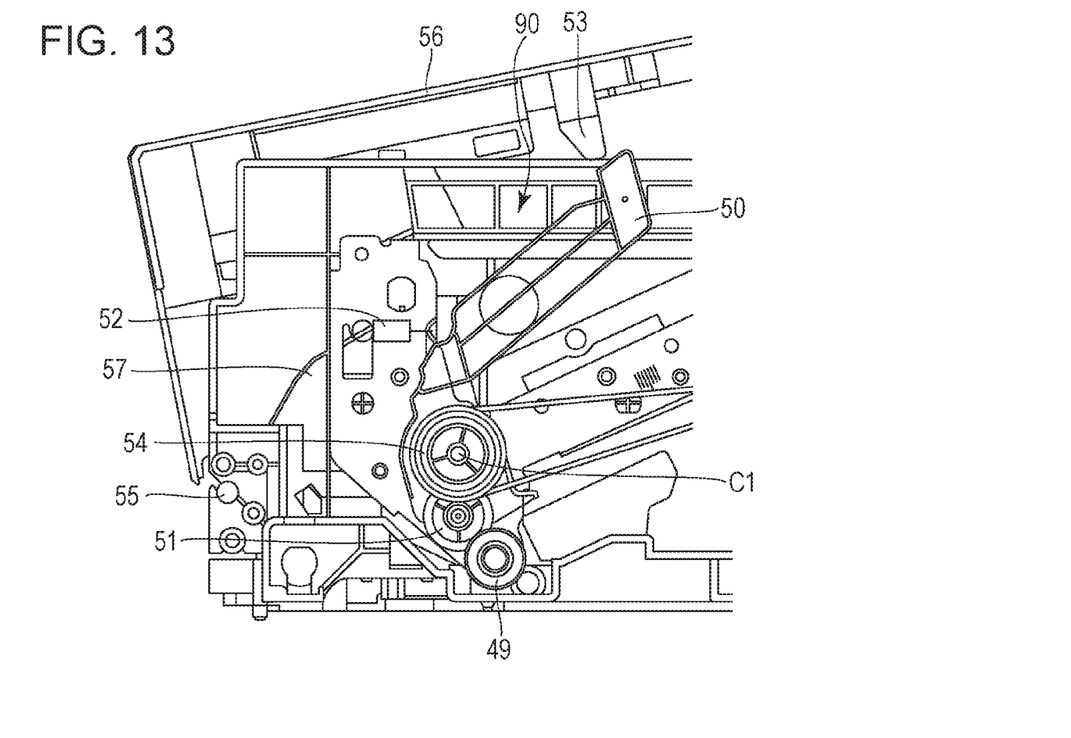
FIG. 13 is a perspective view of the switching unit in a state in which the cover is open.

Reading the image of the original G by the original flow reading requires that the original G passes through the conveying path in the ADF 301. If the original G is retained, or jams, due to some cause, jam clearing, which is working for removing the jammed original G, is required. For example, as illustrated in FIG. 4, a cover 56, which is openably supported by a main body 57, which is the main body of the ADF 301, is opened by the user in jam clearing. The cover 56 is opened and closed with respect to the main body 57 around an opening and closing shaft 55, as illustrated in FIG. 13.

As illustrated in FIG. 4, the main body 57 includes a first conveyance guide 74, and the cover 56 includes a second conveyance guide 75. In a closed state in which the cover 56 is closed with respect to the main body 57, the second conveyance guide 75 is opposed to the first conveyance guide 74 to form the upstream conveying path R1 together with the first conveyance guide 74. In an opened state in which the cover 56 is opened with respect to the main body 57, the upstream conveying path R1 is opened, as illustrated in FIG. 4. In other words, the cover 56 is configured to shift between the closed state and the opened state. As the cover 56 is opened by the user, so that the upstream conveying path R1 is opened, the original G that has jammed on the upstream conveying path R1 can be removed.

For example, in jam clearing, the ADF 301 is opened with respect to the scanning unit 302, as illustrated in FIG. 5. This allows the user to access the original G that has jammed in the vicinity of the first platen glass 411 or the first platen roller 406 to remove the original G.

However, if the original G has jammed at a position where the original G cannot be accessed even when the cover 56 or the ADF 301 is opened, the jam of the original G cannot be cleared by the method. In particular, if the original G is a small-size original, such as a name card, and has jammed on the downstream conveying path R2 downstream from the upstream conveying path R1 in the original conveying direction, it is difficult to clear the jam of the original G. For this reason, as illustrated in FIG. 4, a jam clearing dial 48, which is an operating unit that is manually rotated by the user, is provided on the main body 57. As the user manually rotates the jam clearing dial 48, the rotation is transmitted to each conveying roller. Thus, the original G on the downstream conveying path R2 can be manually conveyed to a position where the user can access the original G.

The jam clearing dial 48 is covered with the cover 56 in the closed state, as illustrated in FIG. 2, and is exposed when the cover 56 is opened, as illustrated in FIG. 4. For this reason, the user cannot access the jam clearing dial 48 unless the cover 56 is opened, which prevents the user from operating the jam clearing dial 48 by mistake.

Drive Transmission Configuration

Figure 6A:
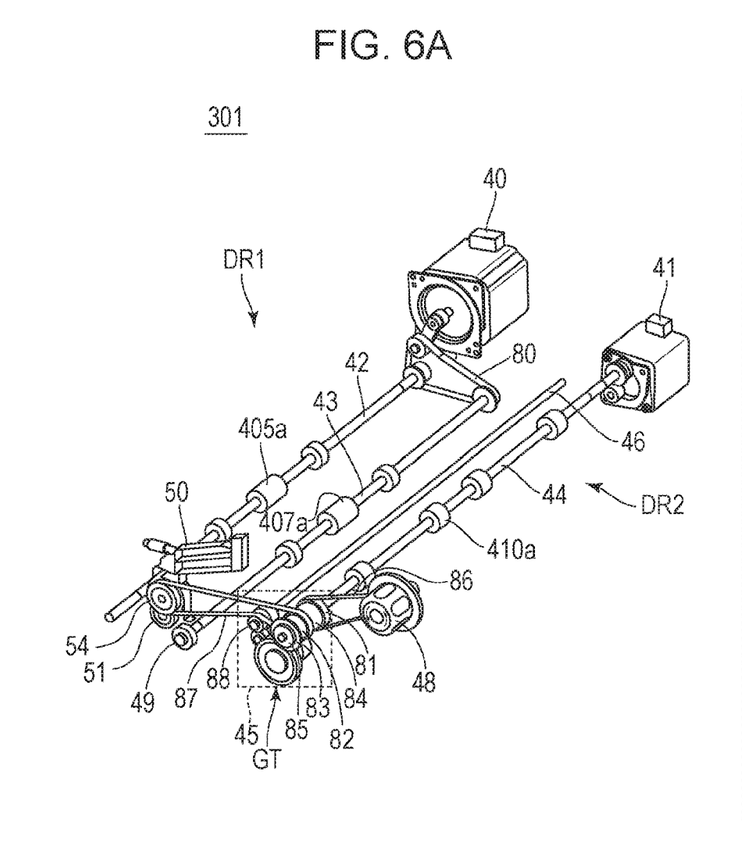
FIG. 6A is a perspective view of a drive transmission configuration in an unconnected state.

Next, a configuration for transmitting drive to each roller in the present embodiment will be described with reference to FIGS. 6A and 6B and FIGS. 7A and 7B. As illustrated in FIG. 6A, the ADF 301 includes a first driving unit DR1 and a second driving unit DR2. The first driving unit DR1 that is driven by a first motor 40 (a first drive source) includes a first rotary shaft 42, a second rotary shaft 43, and a timing belt 80 that transmits the drive of the first motor 40 to the first rotary shaft 42 and the second rotary shaft 43.

The first rotary shaft 42 rotatably supports a first conveying roller 405a which is a driving roller of the conveying roller pair 405. The second rotary shaft 43 rotatably supports a second conveying roller 407a which is a driving roller of the conveying roller pair 407. A first gear 49 is disposed at one end of the second rotary shaft 43. The first platen roller 406, the second platen roller 408, and the conveying roller pair 409 illustrated in FIG. 3 are also driven by the first motor 40 with a drive transmission mechanism (not illustrated). The first conveying roller 405a and the second conveying roller 407a are individually driven by the first motor 40 to constitute a first conveying unit that conveys the original G.

The second driving unit DR2 driven by a second motor 41 (a second drive source) includes a third rotary shaft 44, a second gear 51 engageable with the first gear 49, a gear pulley 54, which is a third gear engageable with the second gear 51, and an output shaft 46. The third rotary shaft 44 rotatably supports a discharge roller 410a, which is a driving roller of the discharge roller pair 410. The discharge roller 410a constitutes a second conveying unit. The first conveying roller 405a, the second conveying roller 407a, and the discharge roller 410a are each disposed at multiple locations in the axial direction.

The third rotary shaft 44 rotatably supports a dial pulley 81, a connection pulley 82, and a reverse rotation gear 83. A first one-way clutch 84 is disposed between the dial pulley 81 and the third rotary shaft 44. A second one-way clutch 85 is disposed between the reverse rotation gear 83 and the third rotary shaft 44. The first one-way clutch 84 is only required to be disposed between the jam clearing dial 48 and the third rotary shaft 44. The second one-way clutch 85 is only required to be disposed between the output shaft 46 and the third rotary shaft 44.

A timing belt 86, which is a first transmission unit, is wound between the dial pulley 81 and a pulley integrated with the jam clearing dial 48. The rotation of the jam clearing dial 48 is transmitted to the dial pulley 81 through the timing belt 86. A timing belt 87 (a second transmission unit) is wound between the connection pulley 82 and the gear pulley 54. The rotation of the connection pulley 82 is transmitted to the gear pulley 54 through the timing belt 87. In the gear pulley 54, a pulley and a gear are integrally formed on the same axis. The gear of the gear pulley 54 will engage with the second gear 51. The rotation of the reverse rotation gear 83 is transmitted to the output shaft 46 via a gear train GT.

A tension pulley 88, which is supported rotatably relative to the output shaft 46, is provided at one end of the output shaft 46. The tension pulley 88 is in contact with the timing belt 87 so as to apply tension thereto. Although the tension pulley 88 is rotated by the timing belt 87, the rotation of the tension pulley 88 is not transmitted to the output shaft 46. Thus disposing the tension pulley 88 and the output shaft 46 so as to overlap with the timing belt 87 in the radial direction reduces the size of the second driving unit DR2.

The direction in which the original G is conveyed toward the original discharge tray 305 is referred to as an original conveying direction. The rotation of the rollers in conveying the original G in the original conveying direction is referred to as normal rotation. The rotation of the rollers in conveying the original G in the direction opposite to the original conveying direction is referred to as reverse rotation. The normal rotation is a first direction, and the reverse rotation is a second direction opposite to the first direction. The first one-way clutch 84 does not transmit the normal rotation of the third rotary shaft 44 to the jam clearing dial 48 but transmits the reverse rotation of the third rotary shaft 44 to the jam clearing dial 48. The first one-way clutch 84 transmits the normal rotation of the jam clearing dial 48 to the third rotary shaft 44 but does not transmit the reverse rotation of the jam clearing dial 48 to the third rotary shaft 44. The second one-way clutch 85 does not transmit the normal rotation of the third rotary shaft 44 to the output shaft 46 but transmits the reverse rotation of the third rotary shaft 44 to the output shaft 46.

Figure 7A:
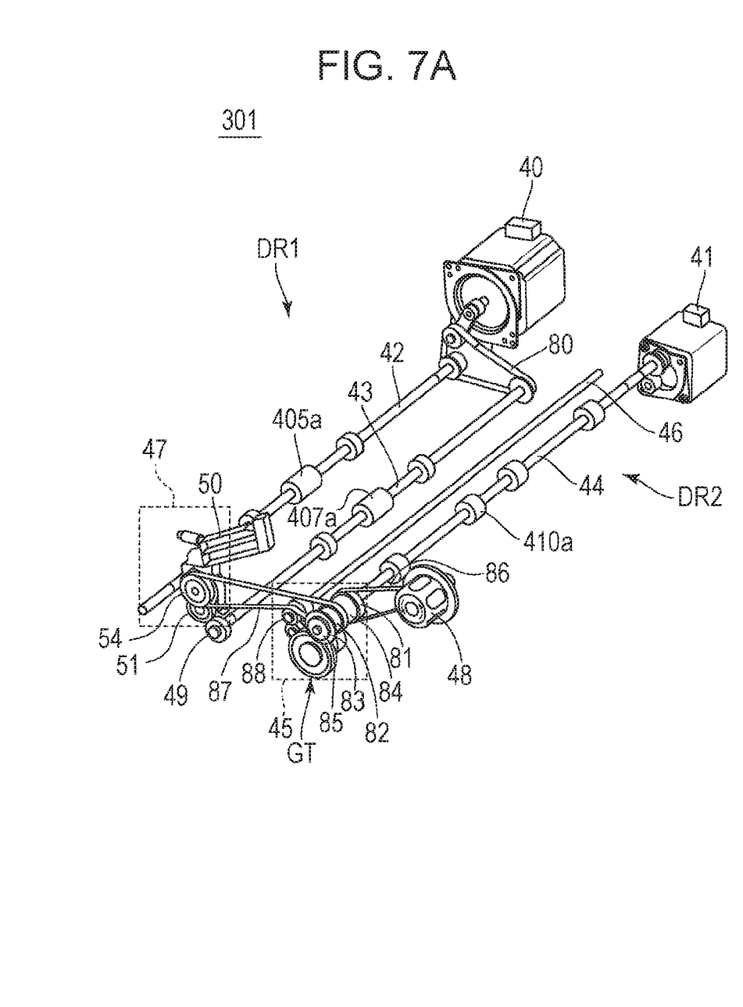
FIG. 7A is a perspective view of a drive transmission configuration in a connected state.

Here, the first and second one-way clutches 84 and 85, the reverse rotation gear 83, and the gear train GT are referred to as a reverse-rotation driving unit 45, and the gear pulley 54 and the second gear 51 are referred to as a jam clearance driving unit 47 (see FIG. 7A).

Figure 6B:
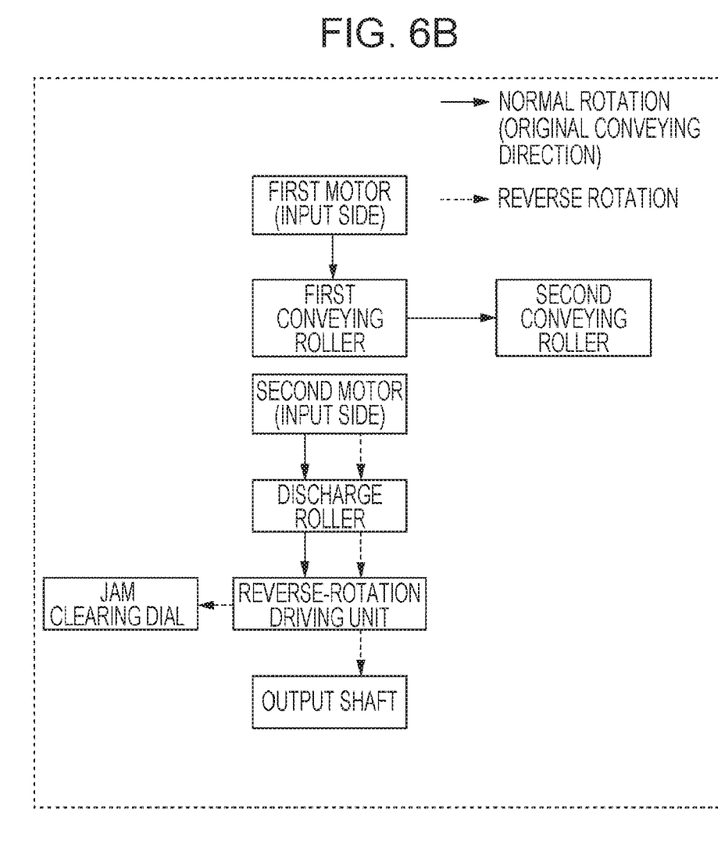
FIG. 6B is a diagram illustrating how rotation input from a first motor and a second motor is transmitted.
Figure 7B:
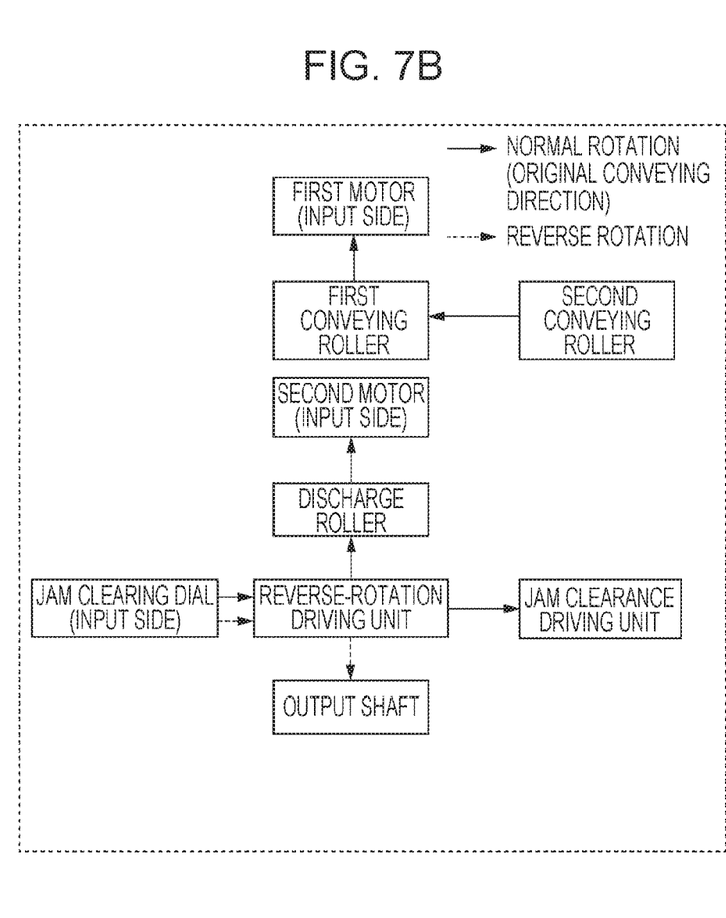
FIG. 7B is a diagram illustrating how rotation input a jam clearing dial is transmitted.

FIG. 6B illustrates a state in which the first gear 49 and the second gear 51 are separated from each other, that is, an unconnected state in which the first driving unit DR1 and the second driving unit DR2 are not drive-connected. FIG. 7B illustrates a state in which the first gear 49 and the second gear 51 engage with each other, that is, a connected state in which the first driving unit DR1 and the second driving unit DR2 are drive-connected. In FIG. 6B and FIG. 7B, the normal rotation is indicated by the solid arrow, and the reverse rotation is indicated by the dashed arrow.

For example, when a copy job is executed, the first motor 40 and the second motor 41 are normally rotated in the unconnected state, as illustrated in FIG. 6B. This causes the conveying roller pairs 405, 107, and 409, the first platen roller 406, the second platen roller 408, and the discharge roller pair 410 including the first conveying roller 405a, the second conveying roller 407a, and the discharge roller 410a to normally rotate. This allows the original G to be conveyed in the original conveying direction.

In contrast, when the jam clearing dial 48 is rotated to normally rotate the rollers to perform jam clearing in the connected state, the normal rotation of the reverse-rotation driving unit 45 is transmitted to the first conveying roller 405a and the second conveying roller 407a via the jam clearance driving unit 17, as illustrated in FIG. 7B. This causes the conveying roller pairs 405, 407, and 409, the first platen roller 406, the second platen roller 408, and the discharge roller pair 410 including the first conveying roller 405a, the second conveying roller 407a, and the discharge roller 410a to normally rotate to convey the original G in the original conveying direction.

Shading Correction

Next, shading correction in the present embodiment will be described with reference to FIGS. 8A and 8B to FIGS. 10A to 10D. The shading correction is to correct unevenness in density level due to the properties of the photoelectric conversion elements of the scanners or the influence of the lens aberration in order to maintain the image reading accuracy constant. The shading correction is regularly performed before the original G is read.

Figure 8A:
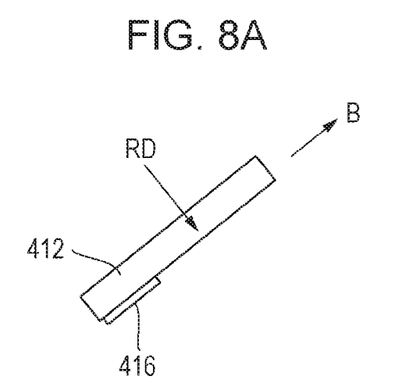
FIG. 8A is a side view of a second platen glass and a shading plate illustrating their positions in scanning an original.

A shading plate 416 is attached to the second platen glass 412, as illustrated in FIG. 8A. The shading plate 416 is a white reference member whose front side is white. The second scanner 415 (see FIG. 3) reads an image on the original G 2 at a reading position RD through the second platen glass 412. The second scanner 415 is fixed to the ADF 301 and does not move. In a normal copy job, the shading plate 416 is positioned off the reading position RD, not obstructing reading of the original G.

Figure 8B:
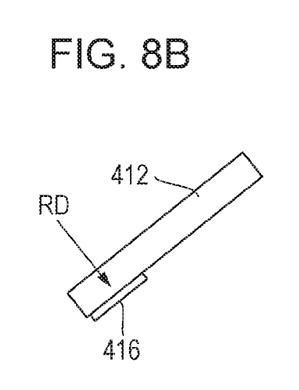
FIG. 8B is a side view of the second platen glass and the shading plate illustrating their positions in performing shading correction.

In shading correction, the second platen glass 412 and the shading plate 416 move in the direction of arrow B so that the shading plate 416 is positioned at the reading position RD, as illustrated in FIG. 8B. The shading plate 416 is read as a white reference by the second scanner 415. In other words, the shading plate 416 functions as a white reference for shading correction.

Figure 9:
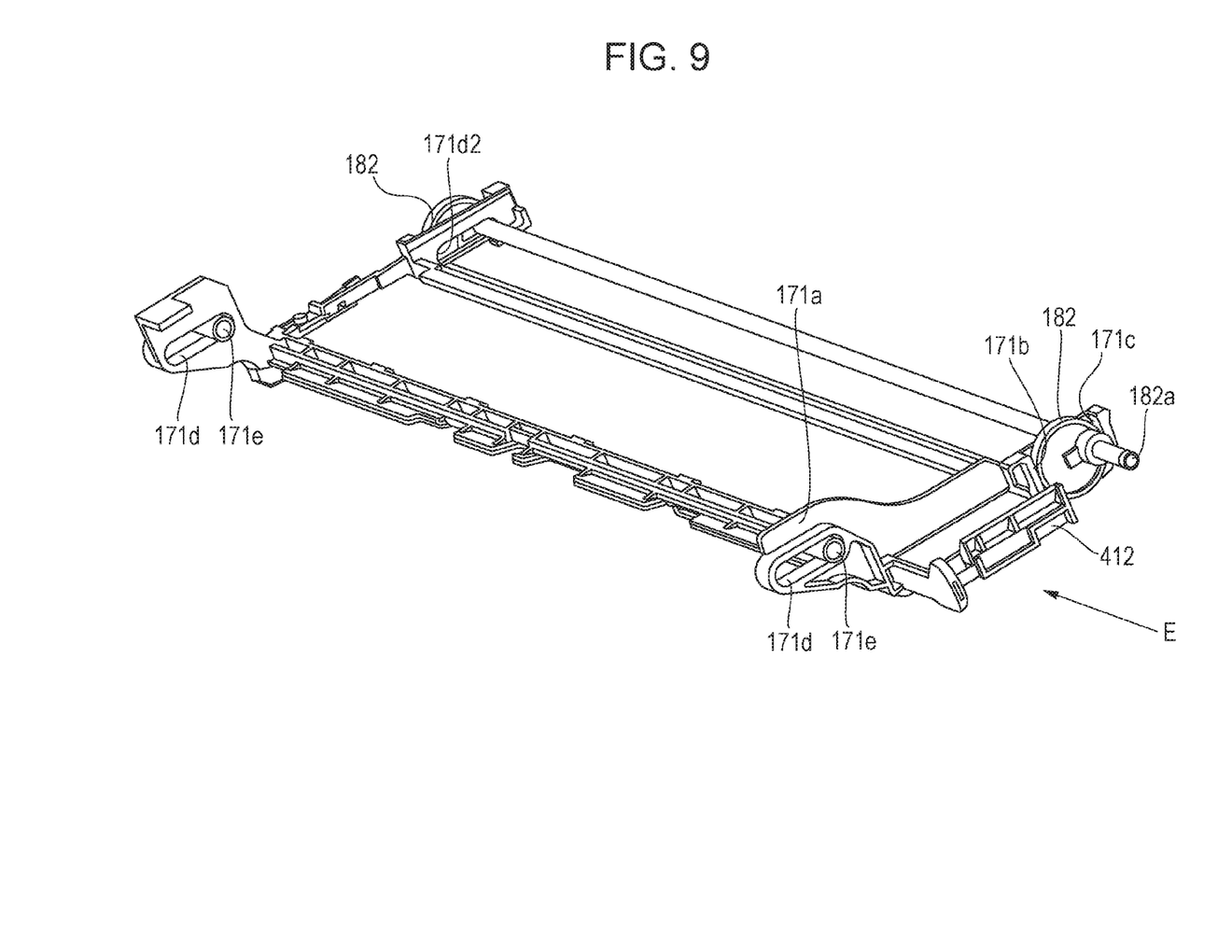
FIG. 9 is a perspective view of a configuration for moving the second platen glass and the shading plate.

Next, a configuration for moving the second platen glass 412 and the shading plate 416 in the direction of arrow B will be described. As illustrated in FIG. 9, the main body 57 of the ADF 301 includes pins 171e and 171e. The pins 171e and 171e respectively engage with long holes 171d and 171d of a glass holder 171a. The glass holder 171a holds the second platen glass 412. At least the upper part of the second platen glass 412 is made of glass so as to allow the light from the second scanner 415 to pass through.

The glass holder 171a has long holes 171d2 and 171d2 downstream in the original conveying direction, through which a camshaft 182a to which drive is transmitted from the output shaft 46 (see FIG. 6A) passes. Cams 182, which are eccentric cams, are fixed to both ends of the camshaft 182a. Each cam 182 is in contact with a first abutting portion 171b and a second abutting portion 171c of the glass holder 171a. The first abutting portion 171b and the second abutting portion 171c are opposed to each other, with the cant 182 therebetween.

Figure 10A:
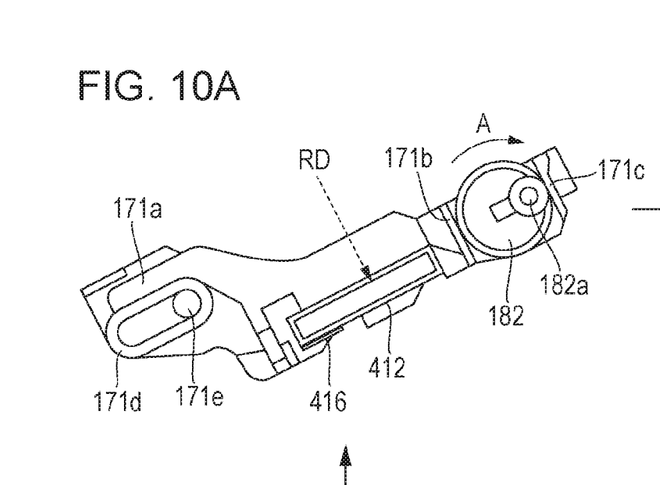
FIG. 10A is a cross-sectional view of a glass holder positioned at a normal position.
Figure 10B:
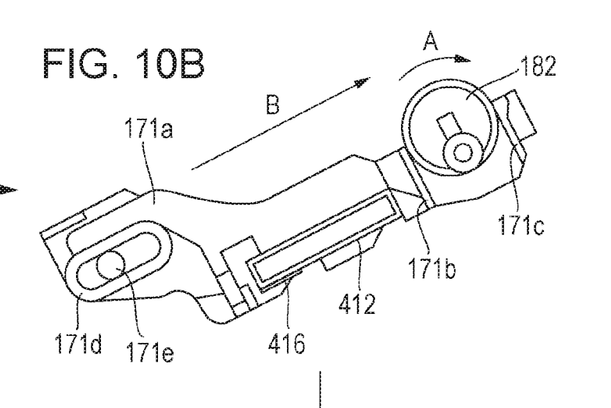
FIG. 10B is a cross-sectional view of the glass holder on the way to move from the normal position to a shading position.
Figure 10C:
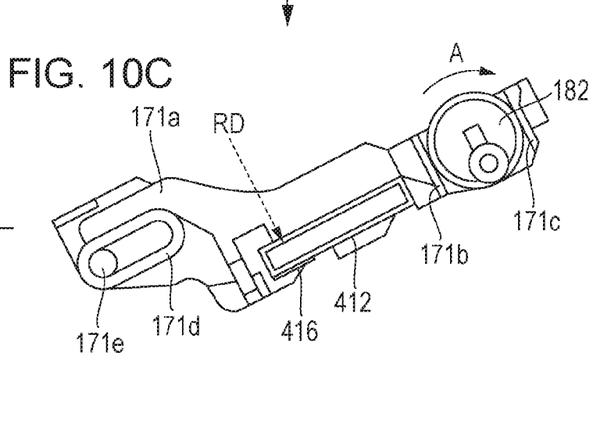
FIG. 10C is a cross-sectional view of the glass holder positioned at the shading position.
Figure 10D:
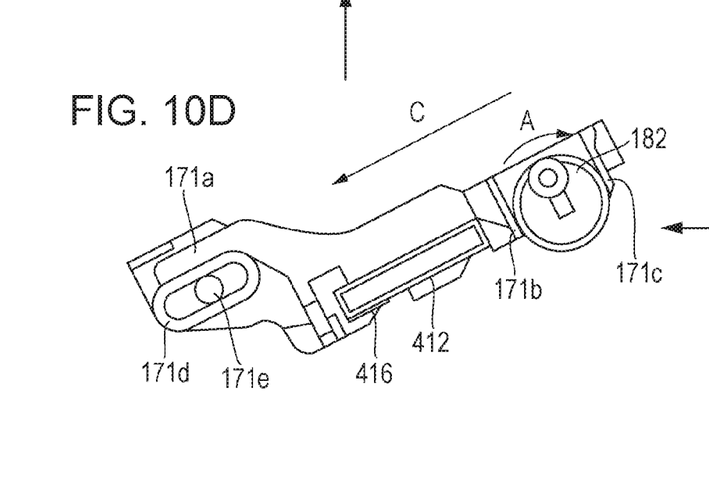
FIG. 10D is a cross-sectional view of the glass holder on the way from the shading position to the normal position.

FIGS. 10A to 10D are cross-sectional views of the glass holder 171a viewed from the direction of arrow E in FIG. 9, the glass holder 171a moving according to the phase of the cam 182. FIG. 10A is a cross-sectional view of the glass holder 171a positioned at a normal position where the original G is scanned. FIG. 10C is a cross-sectional view of the glass holder 171a positioned at a shading position where shading correction is performed. FIG. 10B is a cross-sectional view of the glass holder 171a on the way to move from the normal position to the shading position. FIG. 10D is a cross-sectional view of the glass holder 171a on the way from the shading position to the normal position.

As illustrated in FIG. 10A, when the glass holder 171a is positioned at the normal position, the shading plate 416 attached to the second platen glass 412 is positioned off the reading position RD of the second scanner 415. As illustrated in FIG. 10B, when the output shaft 46 (see FIG. 6A) reversely rotates, so that the cam 182 rotates in the direction of arrow A, the first abutting portion 171b and the second abutting portion 171c follow the movement of the cam 182, so that the glass holder 171a moves in the direction of arrow B. In other words, the cam 182 moves the shading plate 416 that moves together with the glass holder 171a in the direction of arrow B.

When the cam 182 further rotates in the direction of arrow A, the glass holder 171a further moves in the direction of arrow B, so that the shading plate 416 is positioned at the reading position RD of the second scanner 415, as illustrated in FIG. 10C. In this state, the shading plate 416 is read as a white reference by the second scanner 415. Thereafter, when the cam 182 further rotates in the direction of arrow A, the glass holder 171a moves in the direction of arrow C opposite to the direction of arrow B, as illustrated in FIG. 10D. When the cam 182 further rotates in the direction of arrow A, the glass holder 171a moves in the direction of arrow B, so that the glass holder 171a returns to the normal position, as illustrated in FIG. 10A.

When the second motor 41 reversely rotates, with the first driving unit DR1 and the second driving unit DR2 unconnected, as illustrated in FIG. 6B, the discharge roller 410a, the jam clearing dial 48, and the output shaft 46 reversely rotate. In shading correction, for example, only the second motor 41 is reversely rotated, with the first motor 40 stopped. This causes the output shaft 46 to reversely rotate to thereby move the shading plate 416 together with the glass holder 171a, allowing shading correction. Further reversely rotating the second motor 41 to return the glass holder 171a to the normal position and thereafter normally rotating the first motor 40 and the second motor 41 allows performing the copy job with good reading accuracy. An example of the second motor 41 is a stepping motor.

Switching Unit

Figure 11:
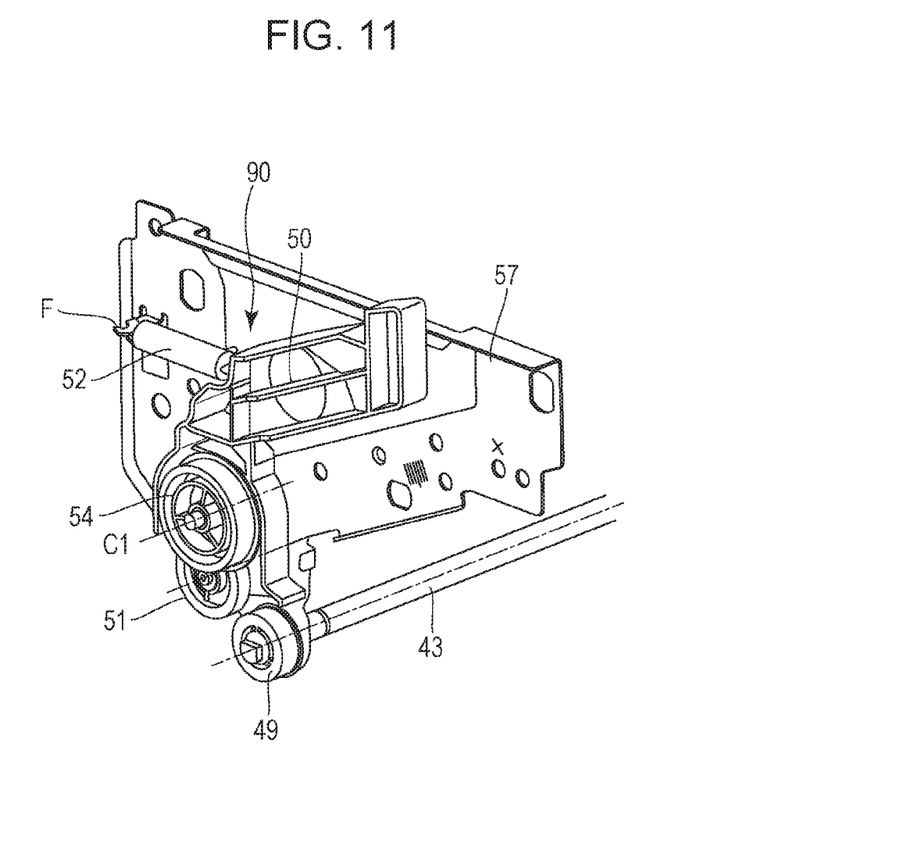
FIG. 11 is a perspective view of a switching unit.

Next, a switching unit 90 that switches the first driving unit DR1 and the second driving unit DR2 between the connected state and the unconnected state will be described with reference to FIGS. 11 to 13. As illustrated in FIG. 11, the switching unit 90 includes an operatively connected member 50 supported by the main body 57 of the ADF 301 so as to rotate around a rotation fulcrum C1 and a compression spring 52 connected at one end to a hook F of the main body 57 and urging the operatively connected member 50. The operatively connected member 50 supports the gear pulley 54 so that the gear pulley 54 can rotate around the rotation fulcrum C1 and also rotatably supports the second gear 51 engaging with the gear pulley 54. Both of the operatively connected member 50 and the gear pulley 54 rotate around the rotation fulcrum C1. Therefore, even when the operatively connected member 50 rotates, the gear pulley 54 and the second gear 51 engage all the time. The compression spring 52 serving as an urging member urges the operatively connected member 50 in a direction in which the second gear 51 moves close to the first gear 49.

Figure 12:
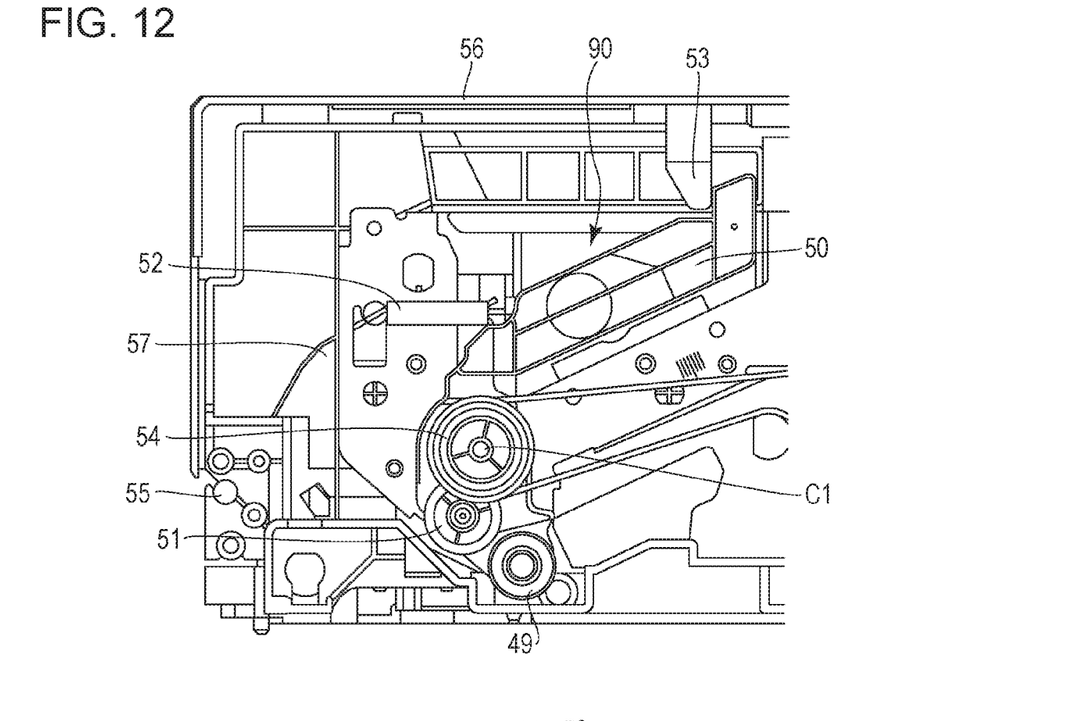
FIG. 12 is a perspective view of the switching unit in a state in which the cover is closed.

As illustrated in FIG. 12, the cover 56 includes a protrusion 53 that protrudes downward to allow pushing the operatively connected member 50. When the cover 56 is closed, the protrusion 53 of the cover 56 pushes the operatively connected member 50 downward against the urging force of the compression spring 52. At that time, the operatively connected member 50 is positioned at a separate position where the second gear 51 is held separate from the first gear 49. For this reason, when the cover 56 is closed, the first driving unit DR1 and the second driving unit DR2 are in the drive-unconnected state.

As illustrated in FIG. 13, when the cover 56 is opened around the opening and closing shaft 55 by the user, the protrusion 53 is separated from the operatively connected member 50, so that the operatively connected member 50 rotates counterclockwise in FIG. 13 by the urging force of the compression spring 52. The operatively connected member 50 comes to an engaging position where the second gear 51 is held engaged with the first gear 49. Thus, when the cover 56 is open, the first driving unit DR1 and the second driving unit DR2 are drive-connected.

Thus, when the cover 56 is closed, the switching unit 90 makes the first driving unit DR1 and the second driving unit DR2 unconnected, and when the cover 56 is open, makes them connected. When the cover 56 shifts from the opened state to the closed state, the operatively connected member 50 is pushed from the engaging position to the separate position by the protrusion 53 of the cover 56 against the urging force of the compression spring 52. When the cover 56 shifts from the closed state to the opened state, the operatively connected member 50 moves to the engaging position by the urging force of the compression spring 52.

As described above, the present embodiment includes the first driving unit DR1 and the second driving unit DR2 including different drive sources. In the normal state in which no jam clearing is performed, the cover 56 is closed, and the first driving unit DR1 and the second driving unit DR2 are in the unconnected state in which they are not drive-connected. Therefore, for example, in a copy job, even when the first motor 40 and the second motor 41 are normally rotated to convey the original G, the driving forces of the first motor 40 and the second motor 41 are not united, preventing damage to the motors and the gears. Furthermore, although shading correction can be performed by reversely rotating the second motor 41, the driving force of the second motor 41 is not transmitted to the first driving unit DR1, reducing the load on the second motor 41.

When the cover 56 is opened for jam clearing, the first driving unit DR1 and the second driving unit DR2 are drive-connected. By the user normally rotating the jam clearing dial 48 in this state, all the rollers connected to the first driving unit DR1 and the second driving unit DR2 can be normally rotated. Specifically, the conveying roller pairs 405, 407, and 409, the first platen roller 406, the second platen roller 408, and the discharge roller pair 410 normally rotate to convey the original G to a position where the user can access the original G for jam clearing. In jam clearing using the jam clearing dial 48, as many rollers as possible may be connected to the jam clearing dial 48. In the present embodiment, even if the original G jams on the downstream conveying path R2 located at the back of the main body 57, the original G can be conveyed without trouble, enhancing the jam clearing performance.

Since the first motor 40 and the second motor 41 each have a drive source, a sufficient torque for conveying the original G can be secured, and each motor can be reduced in size. In the present embodiment, the cover 56 has the protrusion 53. The present disclosure is not limited this configuration. The operatively connected member 50 may be pushed by the smooth surface of the cover 56.

In the present embodiment, the jam clearing dial 48 is configured to transmit drive to the third rotary shaft 44 of the second driving unit DR2 by using the timing belt 87. The present disclosure is not limited to the configuration. For example, the jam clearing dial 48 may be configured to transmit the drive to the first rotary shaft 42 or the second rotary shaft 43 of the first driving unit DR1. In other words, the jam clearing dial 48 may be configured to transmit the driving force to at least one of the first driving unit DR1 and the second driving unit DR2 by being rotated.

In the present embodiment, the cam 182 is fixed to the camshaft 182a driven through the output shaft 46. The present disclosure is not limited to this configuration. The cam 182 may be fixed to the output shaft 46.

In the present embodiment, the conveying roller pairs 405, 407, 408, and 409, the first platen roller 406, and the second platen roller 408 are driven in the first driving unit DR1, and the discharge roller pair 410 is driven in the second driving unit DR2. However, the present disclosure is not limited to this configuration. Which roller is driven by which driving unit may be freely set.

Although the above configurations have been described using the electrophotographic printer 200 as an example, the present disclosure is not limited thereto. For example, the present disclosure can also be applied to an inkjet image forming apparatus that forms an image on a sheet by ejecting ink from nozzles. Although the first driving unit DR1 and the second driving unit DR2 of the present embodiment are disposed in the ADF 301, the present disclosure is not limited to this configuration. For example, the present disclosure may be applied to any of the driving units of the printer main body 202.

Figure 15A:
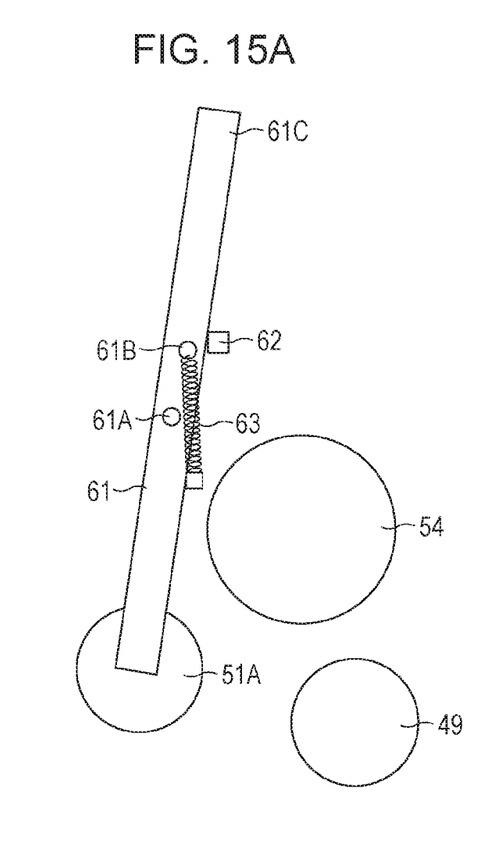
FIG. 15A is a diagram illustrating a modification.
Figure 15B:
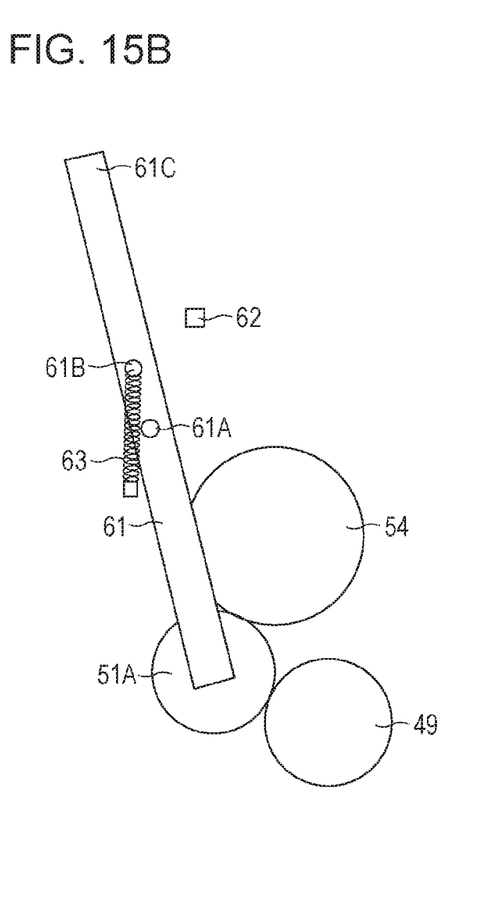
FIG. 15B is a diagram illustrating the modification.

The present embodiment illustrates a configuration in which the first driving unit DR1 and the second driving unit DR2 are connected according to the operation of opening the cover 56. Alternatively, the first driving unit DR1 and the second driving unit DR2 may be operatively connected by a user operation of moving a member different from the cover 56, as in the following modification (see FIGS. 15A and 15B). In FIGS. 15A and 15B, a lever 61 is rotatable around a fulcrum 61A. A movable gear 51A is rotatably supported by the lever 61. FIG. 15A illustrates a state in which the gear 51A is separate from the gear pulley 54 of the second driving unit DR2 and the first gear 49 of the first driving unit DR1. FIG. 15B illustrates a state in which the gear 51A engages with the gear pulley 54 of the second driving unit DR2 and the first gear 49 of the first driving unit DR1. A tension spring 63 is attached to the lever 61. The tension spring 63 urges a lever-61 attaching portion 61B downward. In FIG. 15A, the clockwise rotation of the lever 61 due to the force of the tension spring 63 is stopped by a stopper 62. When a jam occurs, the user operates an end 61C of the lever 61 before operating the jam clearing dial 48. Specifically, the user moves the end 61C of the lever 61 to the left in FIG. 15A to shift to the state in FIG. 15B. In FIG. 15B, the first driving unit DR1 and the second driving unit DR2 are connected by the gear 51A. After the jam clearing operation ends, the user operates the end 61C of the lever 61 to shift to the state in FIG. 15A. As illustrated in the modification in FIGS. 15A and 15B, the gear 51A that moves to connect the first driving unit DR1 and the second driving unit DR2 together is separate from both of the first driving unit DR1 and the second driving unit DR2 in the unconnected state. Although FIGS. 15A and 15B illustrate a configuration in which the lever 61 is manually moved by the user, a solenoid may be connected to the lever 61 to move the lever 61 with the solenoid. In using the solenoid, the following configuration may be used. When a jam occurs, the solenoid is driven to shift the lever 61 from the state in FIG. 15A to the state in FIG. 15B. Then, after the jam is cleared and before the sheet is fed, the drive of the solenoid may be cancelled, and the lever 61 may be shifted to the state in FIG. 15A by the spring force. Since the rotation of jam clearing dial 48 is transmitted to the first driving unit DR1 and the second driving unit DR2 in any configurations described above, the jam clearing performance can be enhanced.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-122285, filed Jun. 27, 2018 and No. 2019-088185, filed May 8, 2019, which are hereby incorporated by reference herein in their entirety

What is claimed is:

1. A sheet conveying apparatus comprising:
a first drive source;
a first driving unit configured to be driven by a driving force of the first drive source and including a first roller configured to convey a sheet;
a second drive source;
a second driving unit configured to be driven by a driving force of the second drive source and including a second roller configured to convey the sheet;
an operating unit configured to rotate when manually operated; and
a switching unit configured to switch a state of the sheet conveying apparatus between a first state in which the first driving unit and the second driving unit are not connected to each other and a second state in which the first driving unit and the second driving unit are connected to each other,
wherein, in the second state, rotation of the operating unit is transmitted to the first driving unit to rotate the first roller, and rotation of the operating unit is transmitted to the second driving unit to rotate the second roller.

2. The sheet conveying apparatus according to claim 1, wherein the switching unit includes a movable gear,
wherein, in the first state, the movable gear is located at a position where connection between the movable gear and at least one of the first driving unit and the second driving unit is released, and wherein, in the second state, the movable gear is located at a position where the movable gear is connected to the first driving unit and the second driving unit.

3. The sheet conveying apparatus according to claim 1, further comprising a cover configured to be located at a closed position where the first roller and the second roller convey the sheet through a conveying path and located at an opened position where the conveying path is opened,
wherein, as the cover moves from the closed position to the opened position, the switching unit switches a state of the sheet conveying apparatus from the first state to the second state.

4. The sheet conveying apparatus according to claim 3, wherein the operating unit is covered with the cover in the closed position and is exposed when the cover is in the opened position.

5. The sheet conveying apparatus according to claim 3,
wherein the first driving unit includes a first gear configured to be driven together with the first roller,
wherein the second driving unit includes a second gear configured to be driven together with the second roller,
wherein the switching unit includes an operatively connected member configured to be operatively connected to the cover and to support the second gear rotatably, and
wherein the operatively connected member holds the second gear away from the first gear when the cover is located at the closed position and holds the second gear engaged with the first gear when the cover is located at the opened position.

6. The sheet conveying apparatus according to claim 5,
wherein the switching unit includes an urging member configured to urge the operatively connected member to an engaging position where the second gear and the first gear engage with each other,
wherein, when the cover moves from the opened position to the closed position, the operatively connected member is moved by the cover from the engaging position against an urging force of the urging member, and when the cover moves from the closed position to the opened position, the operatively connected member is moved to the engaging position by the urging force of the urging member.

7. The sheet conveying apparatus according to claim 6, wherein the cover includes a protrusion configured to push the operatively connected member.

8. The sheet conveying apparatus according to claim 1, wherein the second roller is configured to discharge the sheet outside the sheet conveying apparatus.

9. The sheet conveying apparatus according to claim 8, wherein the second driving unit includes:
a third gear configured to engage with a second gear of the second driving unit,
a rotary shaft that rotatably supports the second roller,
a first transmission unit configured to transmit rotation of the operating unit to the rotary shaft, and
a second transmission unit configured to transmit rotation of the rotary shaft to the third gear.

10. The sheet conveying apparatus according to claim 9, wherein the rotary shaft is configured to be rotated by the second drive source in a first direction and in a second direction opposite to the first direction,
wherein, when the rotary shaft rotates in the second direction, the second roller discharges the sheet outside the sheet conveying apparatus, and
wherein the second driving unit includes a first one-way clutch disposed between the rotary shaft and the operating unit, wherein the first one-way clutch is configured to transmit rotation of the rotary shaft in the first direction to the operating unit and is configured not to transmit rotation of the rotary shaft in the second direction to the operating unit.

11. An image scanning apparatus comprising:
a first drive source;
a first driving unit configured to be driven by a driving force of the first drive source and including a first roller configured to convey a sheet;
a second drive source;
a second driving unit configured to be driven by a driving force of the second drive source and including a second roller configured to convey the sheet;
a scanning unit configured to read an image on the sheet conveyed by the first roller and the second roller;
an operating unit configured to rotate when manually operated; and
a switching unit configured to switch a state of the image scanning apparatus between a first state in which the first driving unit and the second driving unit are not connected to each other and a second state in which the first driving unit and the second driving unit are connected to each other,
wherein, in the second state, rotation of the operating unit is transmitted to the first driving unit to rotate the first roller, and rotation of the operating unit is transmitted to the second driving unit to rotate the second roller.

12. The image scanning apparatus according to claim 11, further comprising:
a white reference member configured to function as a white reference at shading correction performed by the scanning unit; and
a cam configured to be rotated by rotation from the second drive source via the second driving unit to move the white reference member.

13. The image scanning apparatus according to claim 11, further comprising a transparent member through which the scanning unit is configured to read the image on the sheet,
wherein the first roller is configured to convey the sheet to the transparent member, and
wherein the second roller is configured to discharge the sheet outside the image scanning apparatus.

14. An image scanning apparatus comprising:
a first drive source;
a first roller configured to be driven by the first drive source and convey a sheet;
a second drive source;
a second roller configured to be driven by the second drive source and convey the sheet;
a scanning unit configured to read an image on the sheet conveyed by the first roller and the second roller;
an operating unit configured to rotate manually when a jam of the sheet is cleared; and
a switching unit configured to switch a state of the image scanning apparatus between a first state in which rotation of the operating unit is transmitted to both the first roller and the second roller and a second state in which rotation of the operating unit is not transmitted to at least one of the first roller and the second roller.

* * * * *